United States Patent
Schmidt et al.

(10) Patent No.: US 10,889,264 B2
(45) Date of Patent: Jan. 12, 2021

(54) VEHICLE CONTROL LOCKOUT

(71) Applicant: Ford Global Technologies, LLC, Dearborn, MI (US)

(72) Inventors: David J. Schmidt, Dearborn, MI (US); Martin Delonis, Northville, MI (US); Uday Kiran Patil, Canton, MI (US); John Amann, Berkley, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 207 days.

(21) Appl. No.: 15/944,071

(22) Filed: Apr. 3, 2018

(65) Prior Publication Data

US 2019/0299926 A1    Oct. 3, 2019

(51) Int. Cl.
| | |
|---|---|
| *B60R 25/01* | (2013.01) |
| *B60N 2/30* | (2006.01) |
| *B60N 3/10* | (2006.01) |
| *B60R 7/04* | (2006.01) |
| *B60N 3/00* | (2006.01) |

(52) U.S. Cl.
CPC .......... *B60R 25/014* (2013.01); *B60N 2/3011* (2013.01); *B60N 3/102* (2013.01); *B60R 7/043* (2013.01); *B60N 3/002* (2013.01)

(58) Field of Classification Search
CPC ....... B60R 25/014; B60R 7/043; B60R 25/01; B60N 2/3011; B60N 3/102
USPC .......... 296/37.15, 65.09; 297/378.1, 378.11, 297/378.14
See application file for complete search history.

(56) References Cited

U.S. PATENT DOCUMENTS

| | | | | |
|---|---|---|---|---|
| 5,028,086 | A * | 7/1991 | Smith | B60R 25/014 180/287 |
| 2004/0245797 | A1* | 12/2004 | Bixby | B60R 7/043 296/37.15 |
| 2012/0261964 | A1* | 10/2012 | Yamaguchi | B60N 2/12 297/378.14 |
| 2013/0257076 | A1* | 10/2013 | Abro | B60R 7/04 296/24.34 |
| 2016/0023552 | A1* | 1/2016 | Mim | B60K 37/02 296/24.34 |
| 2016/0082867 | A1 | 3/2016 | Sugioka et al. | |
| 2017/0120863 | A1 | 5/2017 | Tsunoda | |
| 2017/0217335 | A1 | 8/2017 | Tominaga et al. | |
| 2017/0334313 | A1 | 11/2017 | Ahn et al. | |

FOREIGN PATENT DOCUMENTS

| | | |
|---|---|---|
| GB | 2533458 A | 6/2016 |
| KR | 101694014 B1 | 9/2017 |

* cited by examiner

*Primary Examiner* — Joseph D. Pape
(74) *Attorney, Agent, or Firm* — Frank A. MacKenzie; Bejin Bieneman PLC

(57) ABSTRACT

A vehicle includes a seat movable from an upright position to a folded position. The vehicle includes a steering wheel in front of the seat. The vehicle includes a lockout box supported by the seat and positioned to restrict access to the steering wheel when the seat is in the folded position.

20 Claims, 18 Drawing Sheets

VEHICLE CONTROL LOCKOUT

BACKGROUND

A vehicle may operate in an autonomous mode, a semi-autonomous mode, or a non-autonomous mode. For purposes of this disclosure, an autonomous mode is defined as one in which each of vehicle propulsion, braking, and steering are controlled by a computer; in a semi-autonomous mode the computer controls one or two of vehicles propulsion, braking, and steering; in a non-autonomous mode, a human operator controls the vehicle propulsion, braking, and steering. Restricting access to controls of the vehicle while the vehicle is operating in the autonomous mode may be desired.

DETAILED DESCRIPTION

Figure 1:
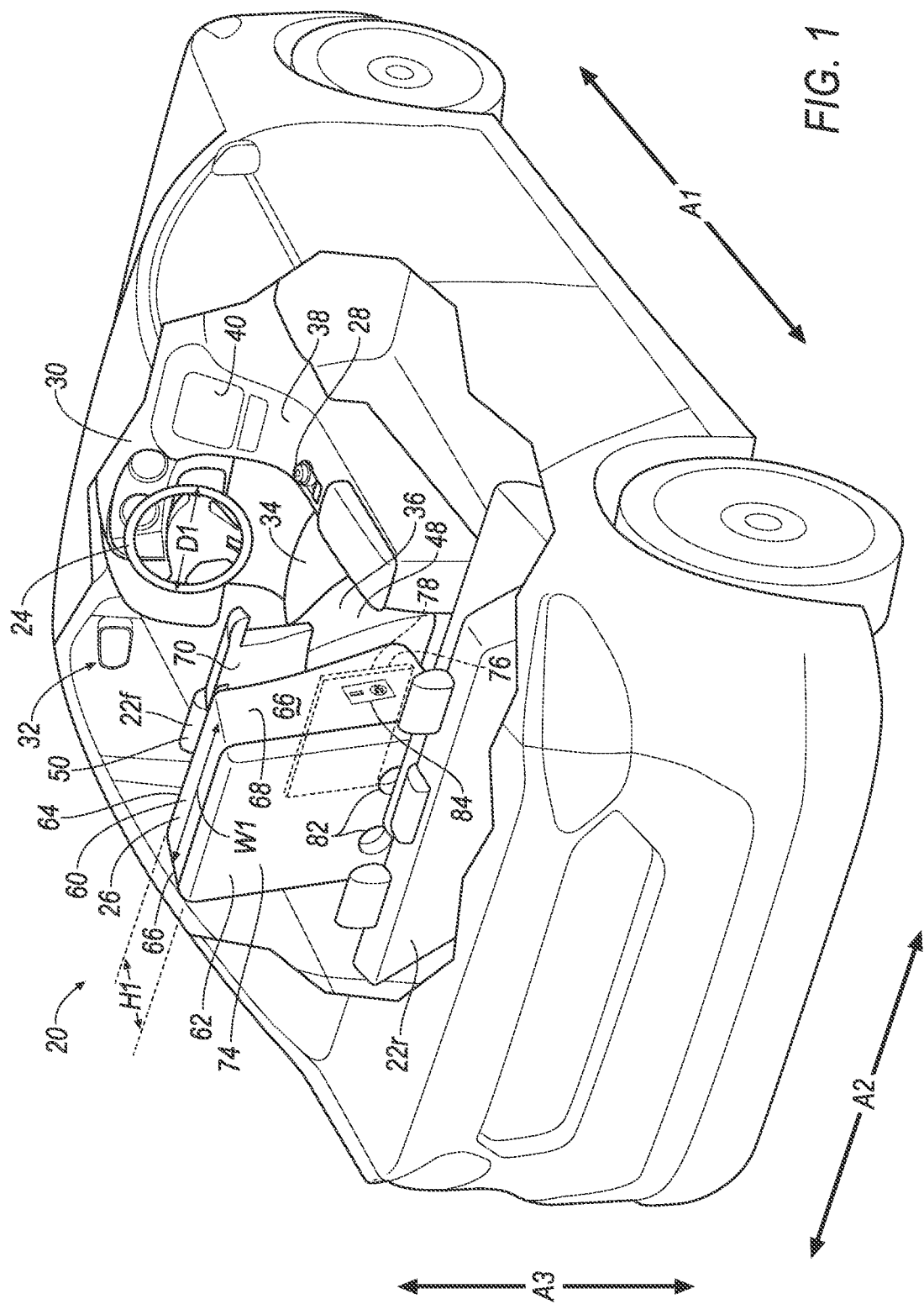
FIG. 1 is a perspective view of a vehicle with a seat in an upright position and supporting a lockout box.
Figure 2:
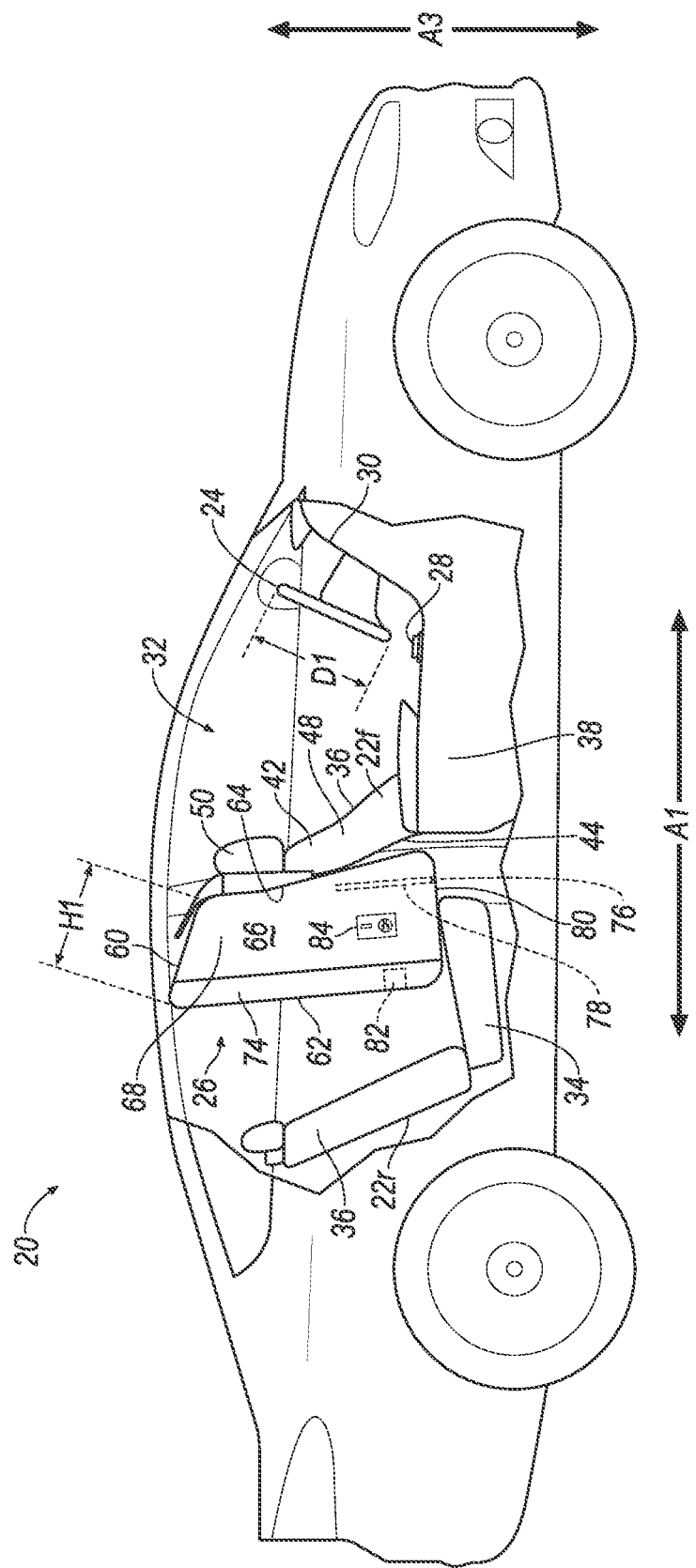
FIG. 2 is a side view of the vehicle with the seat in the upright position and supporting the lockout box.
Figure 3:
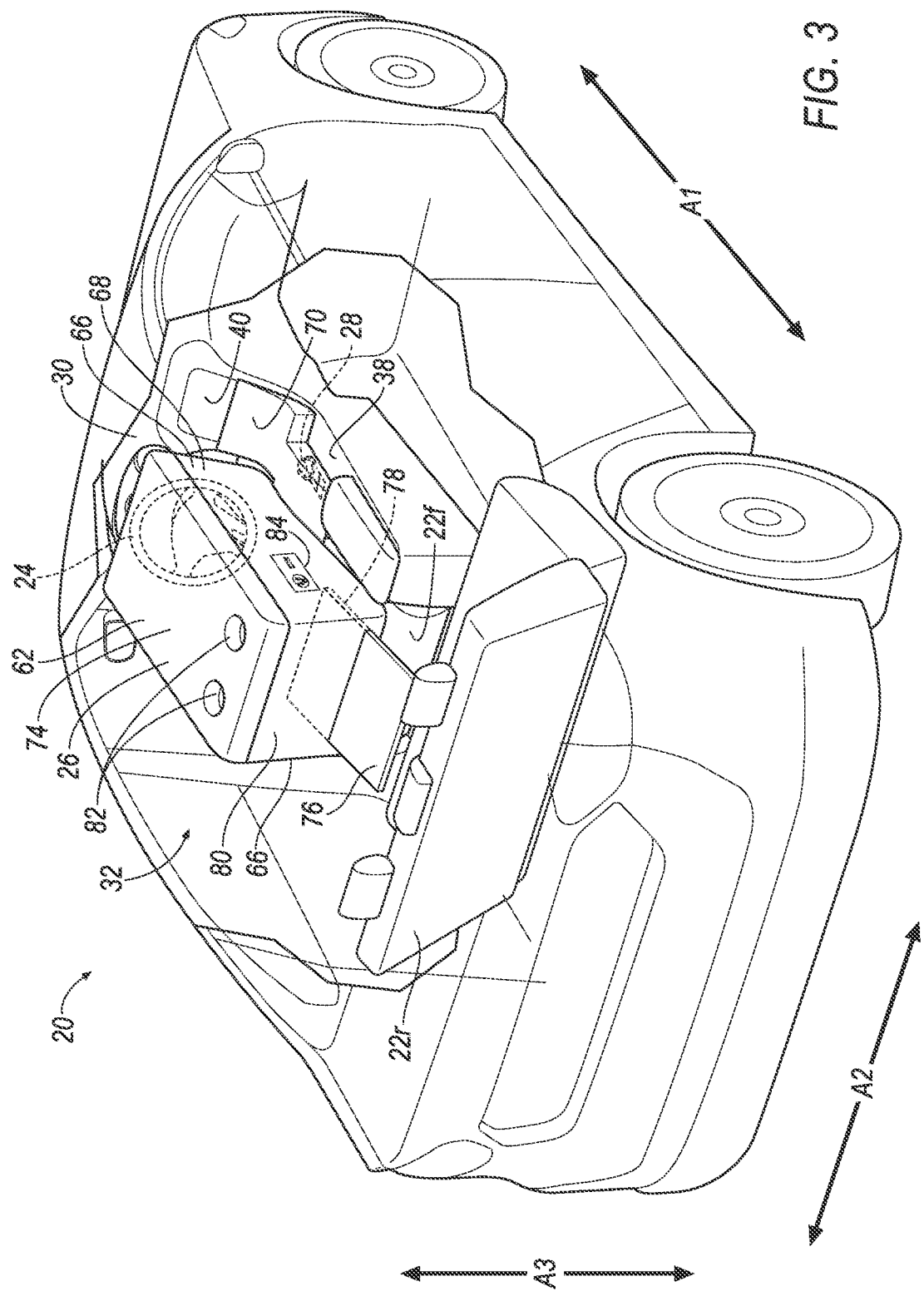
FIG. 3 is a perspective view of the vehicle with the seat in a folded position and supporting the lockout box.
Figure 4:
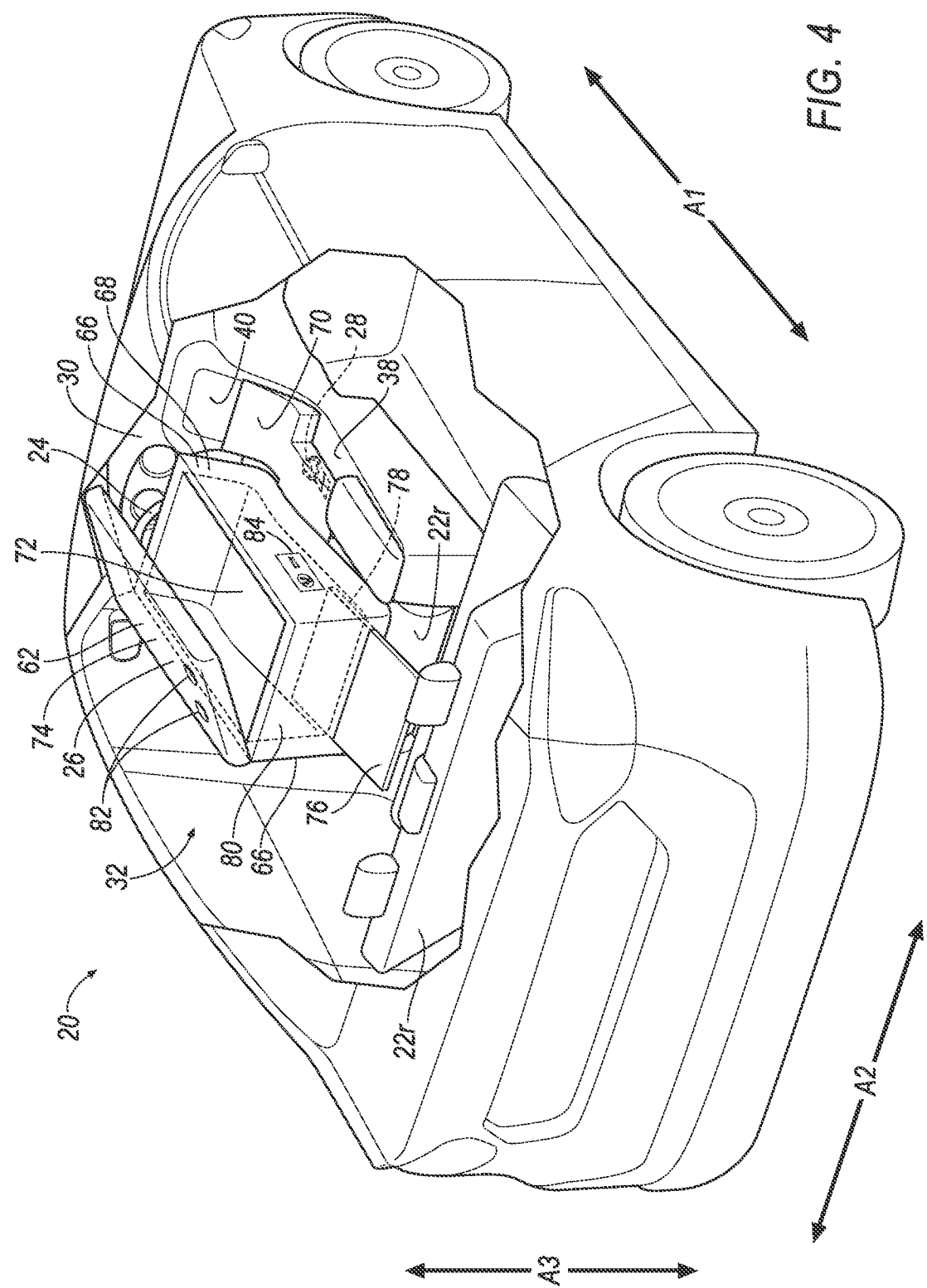
FIG. 4 is a perspective view of the vehicle with the seat in the folded position and supporting the lockout box.
Figure 5:
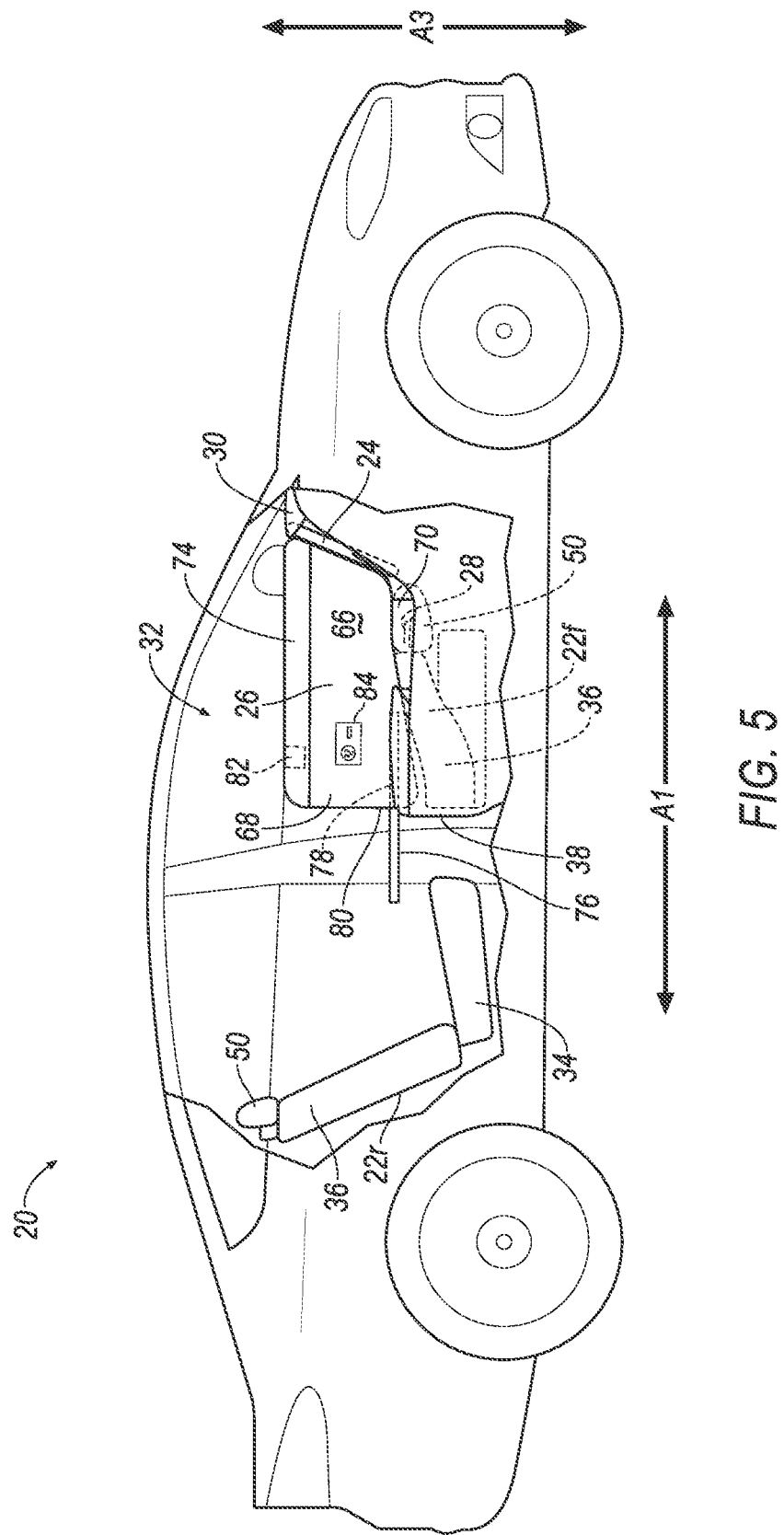
FIG. 5 is a side view of the vehicle with the seat in the folded position and supporting the lockout box.

A vehicle includes a seat movable from an upright position to a folded position. The vehicle includes a steering wheel in front of the seat. The vehicle includes a lockout box supported by the seat and positioned to restrict access to the steering wheel when the seat is in the folded position.

The lockout box may abut the steering wheel when the seat is in the folded position and may be spaced from the steering wheel when the seat is in the upright position.

The seat may include a seat bottom and a seatback, the seatback between the seat bottom and the lockout box when the seat is in the folded position.

The vehicle may include a rail supported by the seat, the lockout box slidably supported by the rail.

The lockout box may be slidable along the rail from a first position spaced from the steering wheel to a second position adjacent the steering wheel when the seat is in the folded position.

The vehicle may include a second seat behind the seat, the lockout box in the first position adjacent the second seat when the seat is in the upright position.

The vehicle may include a gear selector, the lockout box positioned to restrict access to the gear selector when the seat is in the folded position.

The vehicle may include a center console, the gear selector supported by the center console.

The lockout box may include a main body and an extension extending from the main body, the extension positioned to restrict access to the gear selector when the seat is in the folded position.

The vehicle may include an infotainment interface, the lockout box positioned to permit access to the infotainment interface when the seat is in the folded position.

The vehicle may include a passenger cabin, the lockout box positioned to inhibit view of the steering wheel from the passenger cabin when the seat is in the folded position.

An assembly includes a seat bottom and a seatback having a top end opposite a bottom end supported by the seat bottom. The assembly includes a lockout box supported by the seatback and extending away from the bottom end beyond the top end.

The assembly may include a headrest supported by the seatback at the top end.

The seatback may include a first side opposite a second side extending between the top end and the bottom end, and the lockout box may include an extension extending away from the first side beyond the second side and proximate the top end.

The lockout box may be collapsible.

The lockout box may include a bottom, a side, and a hinge connecting the bottom to the side.

The lockout box may define a chamber and may include a lid movable to an open position permitting access to the chamber.

The lockout box may include a shelf movable from a retracted position to an extended position.

The lockout box may include a cupholder.

The lockout box may include an electrical outlet.

With reference to the Figures, wherein like numerals indicate like parts throughout the several views, a vehicle 20 includes a front seat 22f, 122f movable from an upright position to a folded position. The vehicle 20 includes a steering wheel 24 in front of the front seat 22f, 122f. The vehicle 20 includes a lockout box 26, 126, 226 supported by the front seat 22f, 122f and positioned to restrict access to the steering wheel 24 when the front seat 22f, 122f is in the folded position.

The lockout box 26, 126, 226 selectively permits or restricts access to controls of the vehicle 20 used by an operator to navigate the vehicle 20, such as the steering wheel 24, a gear selector 28, etc., e.g. depending on whether the front seat 22f, 122f is in the upright position or the folded position. The front seat 22f, 122f may be in the folded position, with the lockout box 26, 126, 226 restricting access to the steering wheel 24, the gear selector 28, etc., while the vehicle 20 operates in an autonomous mode. The front seat 22f, 122f may be in the upright position, with the lockout box 26, 126, 226 permitting access to the steering wheel 24, the gear selector 28, etc., while the vehicle 20 operates in a semi-autonomous mode or a non-autonomous mode.

The lockout box 26, 226 may be fixed in position relative to the front seat 22f, as shown in the embodiments of FIGS. 1-5 and 11-18. The lockout box 126 may be movable relative to the seat 122f, as shown in the embodiment of FIGS. 6-10. The lockout box 226 may be collapsible, as shown in the embodiment of FIG. 11-18.

The vehicle 20, shown in FIGS. 1-17, may be any passenger or commercial automobile such as a car, a truck, a sport utility vehicle, a crossover vehicle, a van, a minivan, a taxi, a bus, etc.

The vehicle 20 defines a vehicle-longitudinal axis A1, i.e., extending between a front and a rear of the vehicle 20. The vehicle 20 defines a cross-vehicle axis A2, i.e., extending between a left side and a right side of the vehicle 20. The vehicle 20 defines a vehicle-vertical axis A3, i.e., extending between a top and a bottom of the vehicle 20. The vehicle-longitudinal axis A1, the cross-vehicle axis A2, and the vehicle-vertical axis A3 may all be perpendicular to each other. The front, rear, left side, right side, top, and bottom may be relative to an orientation of an operator of the vehicle 20. The front, rear, left side, right side, top, and bottom may be relative to an orientation of controls for operating the vehicle 20, e.g., an instrument panel 30, the steering wheel 24, etc. The front, rear, left side, right side, top, and bottom may be relative to a forward driving direction when wheels of the vehicle 20 are all parallel with each other, etc.

The vehicle 20 may operate in the autonomous mode, the semi-autonomous mode, or the non-autonomous mode. For purposes of this disclosure, the autonomous mode is defined as one in which each of vehicle propulsion, braking, and steering are controlled by a computer; in the semi-autonomous mode the computer controls one or two of vehicle propulsion, braking, and steering; in the non-autonomous mode, a human operator controls the vehicle propulsion, braking, and steering.

The vehicle 20 includes a passenger cabin 32 to house occupants, if any, of the vehicle 20. The passenger cabin 32 includes one or more front seats 22f, 122f disposed at a front of the passenger cabin 32, e.g., relative to one or more back seats 22r disposed behind the front seats 22f, 122f along the vehicle-longitudinal axis A1. Although not shown, it is to be understood that the passenger cabin 32 includes a passenger side front seat, e.g., next to the shown front seat 22f, 122f along the cross-vehicle axis A2. The passenger cabin 32 may also include third-row seats (not shown) at a rear of the passenger cabin 32.

The vehicle 20 includes the instrument panel 30. The instrument panel 30 may be disposed at the front of the passenger cabin 32 and face toward the front seats 22f, 122f. The instrument panel 30 may be elongated along the cross-vehicle axis A2. The instrument panel 30 may include vehicle controls, including the steering wheel 24. The steering wheel 24 allows an operator to steer the vehicle 20 by transmitting rotation of the steering wheel 24 to movement of a steering rack. The steering wheel 24 may be, e.g., a rigid ring fixedly attached to a steering column. The steering column transfers rotation of the steering wheel 24 to movement of the steering rack. The steering column may be, e.g., a shaft connecting the steering wheel 24 to the steering rack.

The steering wheel 24 is in front of one of the front seats 22f, 122f. In front of one of the front seats 22f, 122f may be relative to an occupant seated in such front seat 22f, 122f, e.g., seated on a seat bottom 34 and reclining against a seatback 36 of such front seat 22f, 122f. To put it another way, the seat bottom 34 may be between the seatback 36 and the steering wheel 24 when the front seat 22f, 122f is in the upright position, described below.

The vehicle 20 includes a center console 38. The center console 38 may be elongated along the vehicle-longitudinal axis A1, e.g., between the front seats 22f, 122f. To put it another way, the center console is between the driver side front sear 22f, 122f and the passenger side front seat. The center console 38 may support vehicle controls such as the gear selector 28. The gear selector 28 may select a mode of a transmission of the vehicle 20, e.g., "drive," "park," "reverse," etc. The gear selector 28 may be a knob, lever, etc.

The vehicle 20 may include an infotainment interface 40. The infotainment interface 40 presents information to and receives information from an occupant of the vehicle 20. The information may pertain to entertainment, comfort, etc., of occupants of the passenger cabin 32. For example, the infotainment interface 40 may be used to control audio provided to the passenger cabin 32, heating and/or cooling of the passenger cabin 32, etc. The infotainment interface 40 may be located, e.g., on the instrument panel 30 in the passenger cabin 32 of the vehicle 20, or wherever may be readily seen by the occupant. The infotainment interface 40 may include buttons, knobs, keypads, microphone, dials, digital readouts, screens such as a touch-sensitive display screen, speakers, and so on, e.g., human-machine interface (HMI) elements.

The front seats 22f, 122f are shown as bucket seats, but alternatively the front seats 22f, 122f may be bench seats or another type of seat. The back seats 22r are behind the front seats 22f, 122f, e.g., along the vehicle-longitudinal axis A1. The back seats 22r may be bucket seats, bench seats or another type of seat.

The seatback 36 has a top end 42 opposite a bottom end 44. The top end 42 and the bottom end 44 are relative to the seat bottom 34. To put it another way, the bottom end 44 of seatback 36 is closer to the seat bottom 34 than the top end 42 of seatback 36. The bottom end 44 of the seatback 36 may be supported by the seat bottom 34. For example, the bottom end 44 of the seatback 36 may be pivotably fixed to the seat bottom 34.

The seatback 36 includes a first side 46 opposite a second side 48. The first side 46 and the second side 48 of the seatback 36 extend between the top end 42 and the bottom end 44. The first side 46 and the second side 48 may be spaced from each other along the cross-vehicle axis A2.

The seat bottom 34 and/or the seatback 36 may include a frame 52 and a covering 54 supported on the frame 52. The frame 52 may include tubes, beams, etc. The frame 52 may be formed of any suitable plastic material, e.g., carbon fiber reinforced plastic (CFRP), glass fiber-reinforced semi-finished thermoplastic composite (organosheet), etc. As another example, some or all components of the frame 52 may be formed of a suitable metal, e.g., steel, aluminum, etc.

The covering 54 may include upholstery and padding. The upholstery may be formed of cloth, leather, faux leather, or any other suitable material. The upholstery may be stitched in panels around the frame 52. The padding may be between the upholstery and the frame 52, and may be foam or any other suitable material.

The seat 22*f*, 122*f* may include a headrest 50. The headrest 50 may be supported by the seatback 36 and may be stationary or movable relative to the seatback 36. The headrest 50 may be supported by the seatback 36 at the top end 42. The headrest 50 may include posts 57 that engage the frame 52 of the seatback 36.

The seatback 36, the seat bottom 34, and/or the headrest 50 may be adjustable in multiple degrees of freedom. Specifically, the seatback 36, the seat bottom 34, and/or the headrest 50 may themselves be adjustable, in other words, adjustable components within the seatback 36, the seat bottom 34, and/or the headrest 50, and/or may be adjustable relative to each other.

The front seat 22*f*, 122*f* is movable from the upright position, shown in FIGS. 1, 2, 6, 7, 11, and 12, to a folded position, shown in FIGS. 3-5, 8-10, and 13-17. An occupant is permitted to occupy the front seat 22*f*, 122*f* in the upright position, and is restricted from occupying the front seat 22*f*, 122*f* in the folded position. The seatback 36 and the seat bottom 34 of the front seat 22*f*, 122*f* may define an acute angle in the folded position. The seatback 36 and the seat bottom 34 of the front seat 22*f*, 122*f* may define an obtuse angle in the upright position. The seatback 36 may be between the seat bottom 34 and the lockout box 26, 126, 226 when the seat 22*f*, 122*f* is in the folded position.

With reference to the embodiment shown in FIGS. 6-10, a rail 56 may be supported by the seat 122*f*. The rail 56 supports the lockout box 126 on the seatback 36. The rail 56 may be a shaft, track, or any other suitable structure. The rail 56 may be elongated between the top end 42 of the seatback 36 and the bottom end 44 of the seatback 36. The rail 56 may be fixed to the frame 52. For example, one end of a bracket 58 may be fixed to the frame 52 and extend through the covering 54 to a second end fixed to the rail 56, e.g., via welding, fasteners, etc. The rail 56 may be fixed to the headrest 50. For example, the rail 56 may include a hole, clip, etc., designed to engage with the post 57 of the headrest 50.

Returning to FIGS. 1-17, the lockout box 26, 126, 226 selectively restricts or permits access by an occupant of the vehicle 20 to the steering wheel 24, gear selector 28, etc., e.g., depending on a position of the front seat 22*f*, 122*f*, a position of the lockout box 26, 126, 226, etc. The lockout box 26, 126, 226 physically separates the occupant of the passenger cabin 32 from the steering wheel 24, gear selector 28, etc., to prevent the occupant from accessing the steering wheel 24, gear selector 28, etc. The lockout box 26, 126, 226 may be plastic, or any other suitable material.

With reference to the embodiments shown in FIGS. 1-10, the lockout box 26, 126 may include a front surface 60 extending between a top surface 62 and a bottom surface 64 of the lockout box 26, 126. The bottom surface 64 may face toward the seatback 36 and the top surface 62 may face away from the seatback 36. To put it another way, the bottom surface 64 may be between the seatback 36 and the top surface 62. The front surface 60 may be adjacent or abut the steering wheel 24, e.g., when the front seat 22*f*, 122*f* is in the folded position. The front surface 60 and the top surface 62 may define an acute angle. The front surface 60 and the bottom surface 64 may define an obtuse angle. The acute and obtuse angles provide a complimentary relationship between the front surface 60 and the steering wheel 24, e.g., when the front seat 22*f*, 122*f* is in the folded position.

With reference to the embodiment shown in FIGS. 11-18, the lockout box 226 may be collapsible. To put it another way, the lockout box 226 may move between a collapsed position, shown in FIG. 11-13, and an erect position, shown in FIG. 16-18. For example, the lockout box 226 may include a bottom 164, a top 162, a pair of sides 166, a front 160, and a rear 180. The bottom 164, the top 162, the sides 166, the front 160, and/or the rear 180 may define a chamber 172 when the lockout box 226 is in the erect position. The sides 166 may extend from the bottom 164 to the top 162. The sides 166 may be connected to the top 162 and the bottom 164 with hinges 186. The sides 166 may each include a hinge 188. The hinge 188 may bisect the side 166 and be parallel to the hinges 186 connecting the sides 166 to the top 162 and the bottom 164. The sides 166 may pivot about the hinges 186, 188 to move between the collapsed position and the erect position. The front 160 and the rear 180 may extend from the bottom 164. The front 160 and the rear 180 may be connected to the bottom 164 with hinges 190. The front 160 and the rear 180 may pivot about the hinges 190 to move between the collapsed position and the erect position. The hinges 186, 188, 190 may be living hinges, may include a pin, etc. As other examples in addition to or as alternative to hinges 186, 188, 190, hinges may connect the front 160 and the rear 180 to the top 162, the sides 166 may be connected to the top 162 or the bottom 164 with hinges, the front 160 the rear 180 may include multiple hinges, etc.

Figure 14:
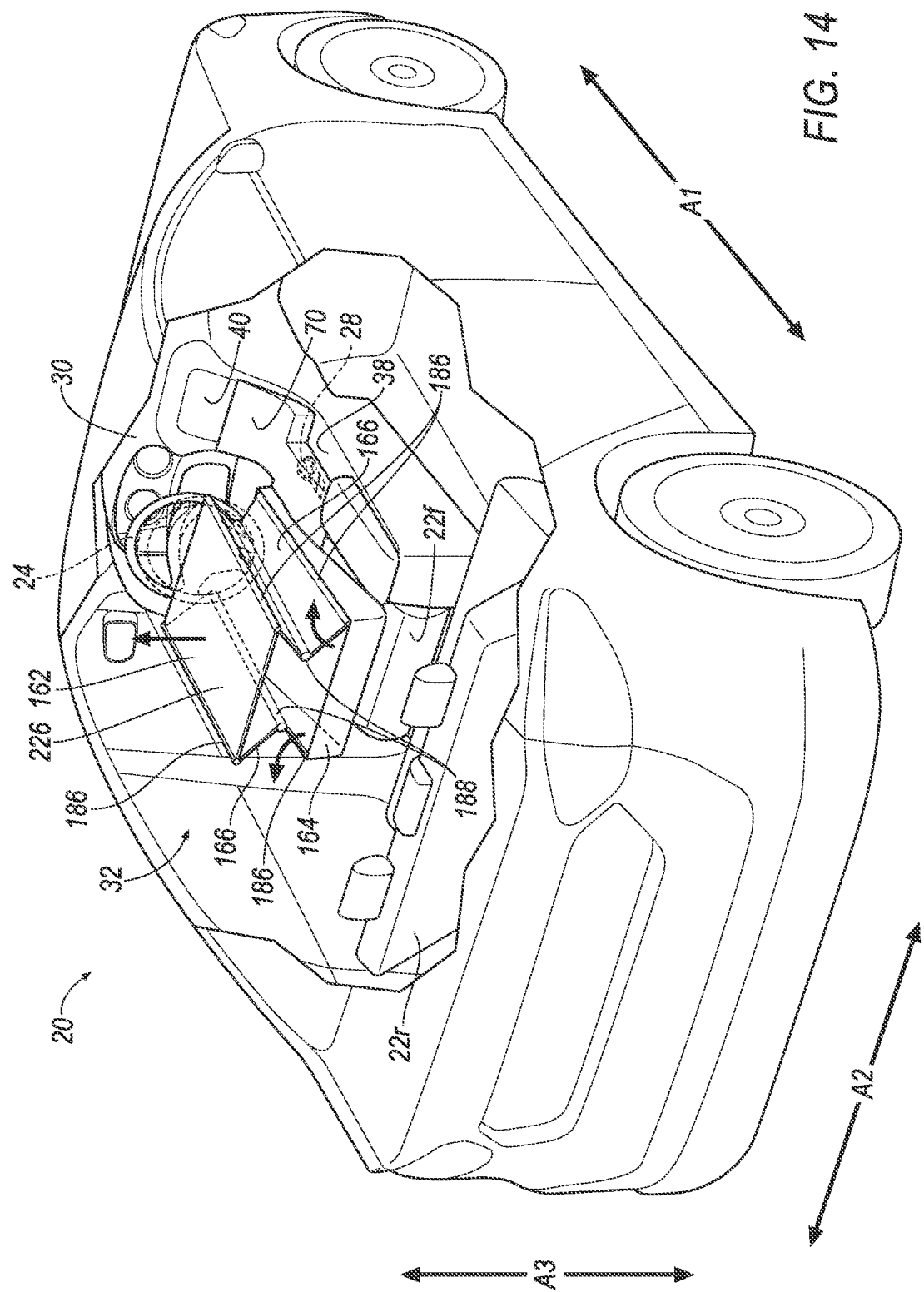
FIG. 14 is a perspective view of the vehicle with the seat in the folded position and supporting the lockout box of FIG. 10 between the collapsed position and an erect position.
Figure 15:
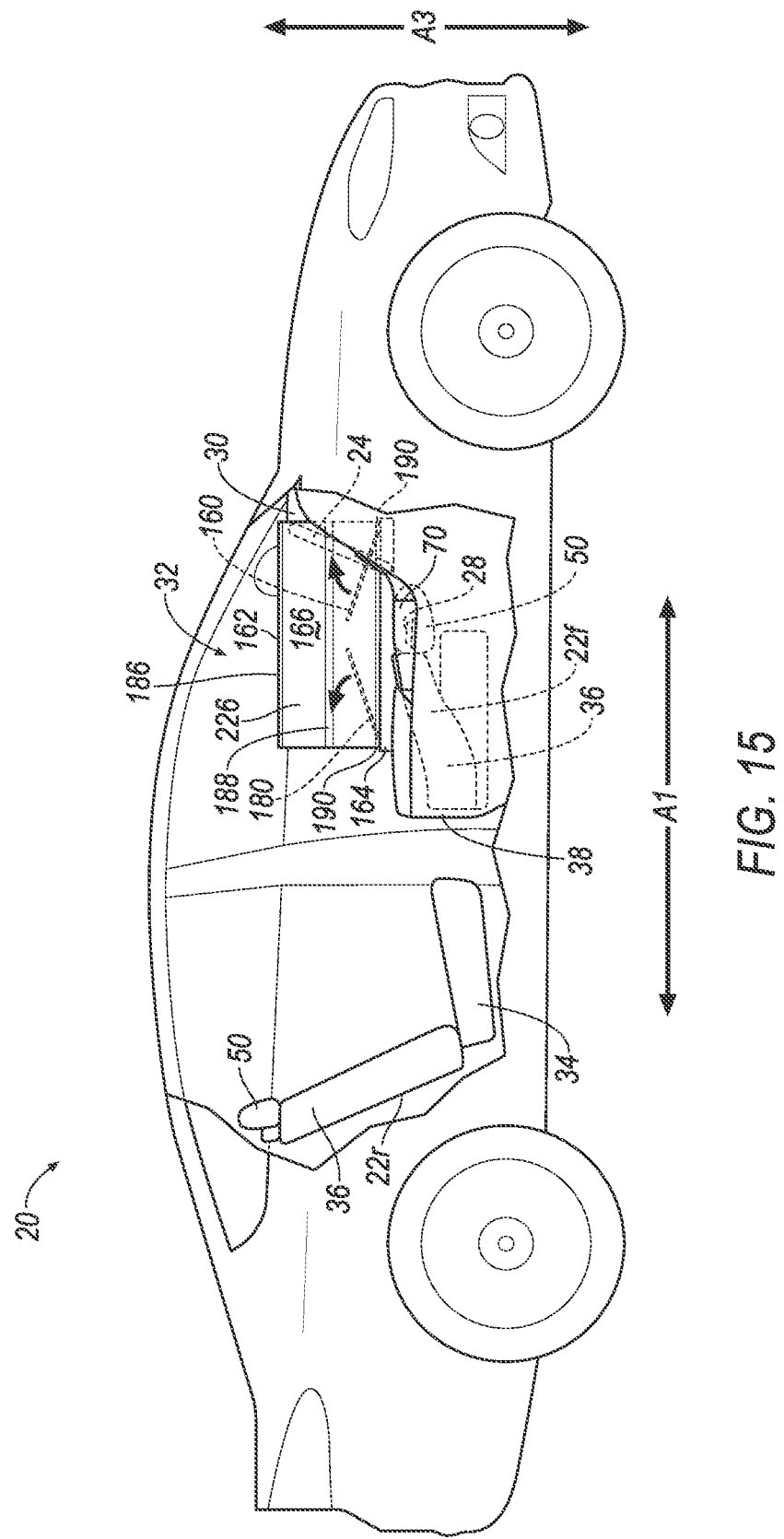
FIG. 15 is a side view of the vehicle with the seat in the folded position and supporting the lockout box of FIG. 10 between the collapsed position and the erect position.
Figure 16:
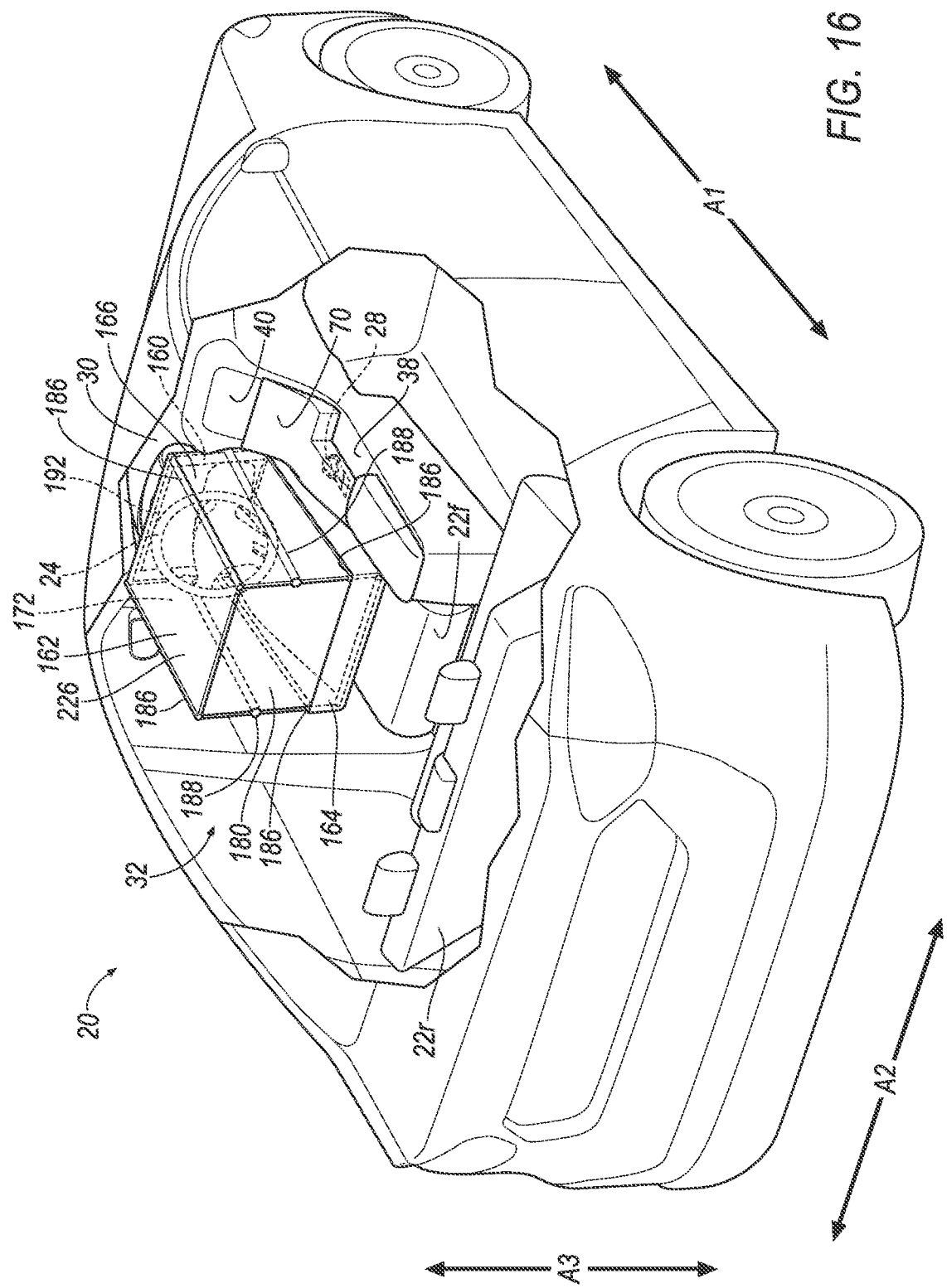
FIG. 16 is a perspective view of the vehicle with the seat in the folded position and supporting the lockout box of FIG. 10 in the erect position.
Figure 17:
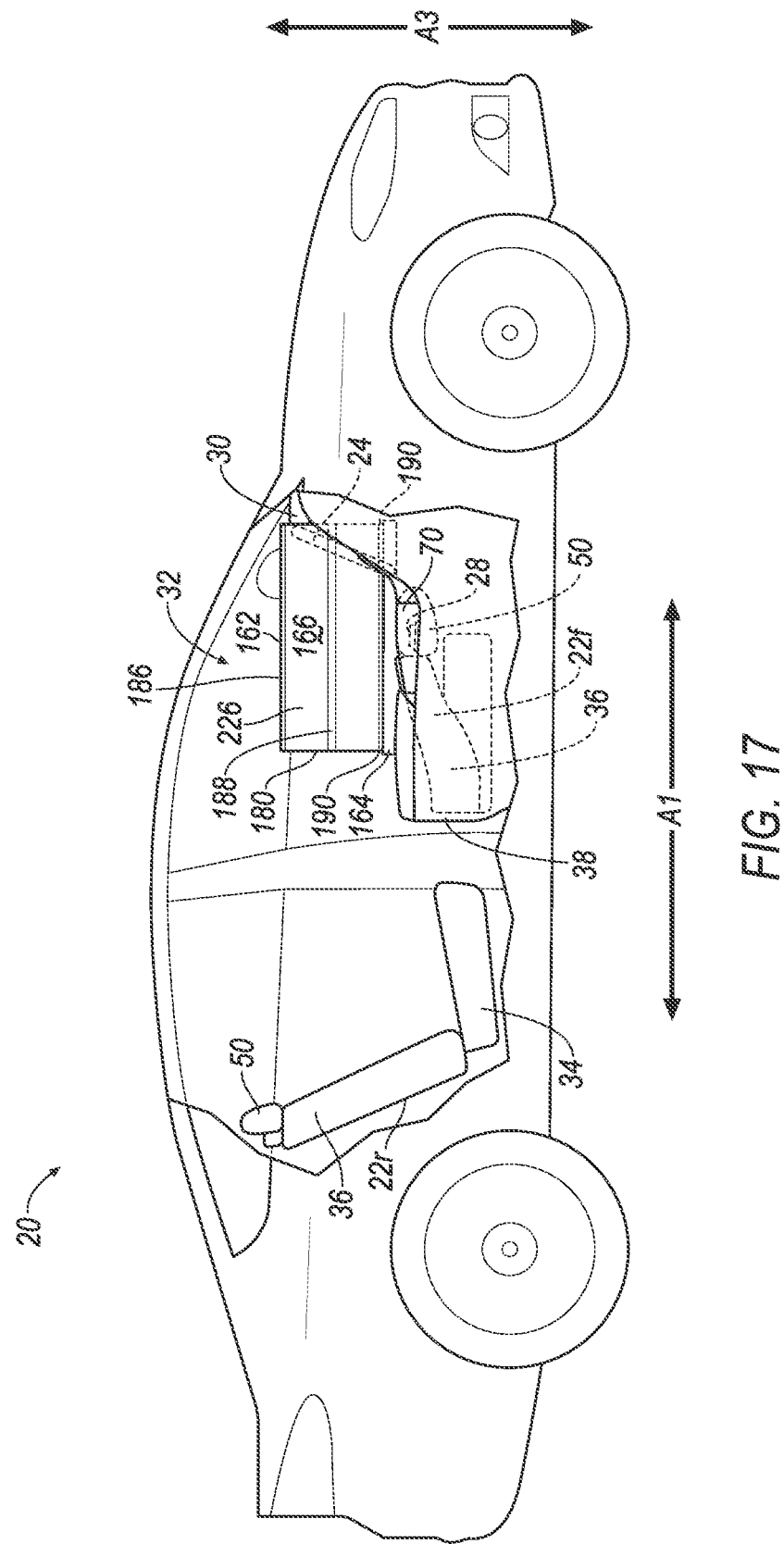
FIG. 17 is a side view of the vehicle with the seat in the folded position and supporting the lockout box of FIG. 10 in the erect position.
Figure 18:
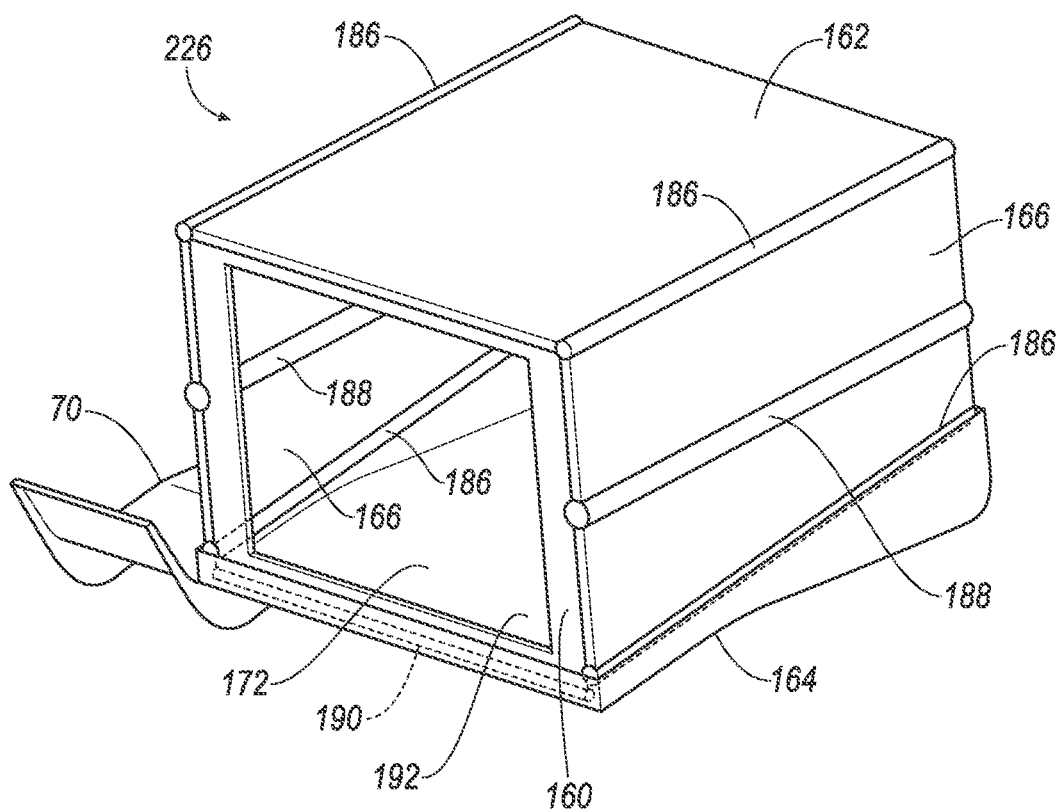
FIG. 18 is a perspective view of the lockout box of FIG. 10 in the erect position.

To move the lockout box 226 from the folded position to the erect position, the top 162 may be moved away from the bottom 164 and the sides 166 unfolded, as shown in FIG. 14. Next, the front 160 and the rear 180 may be unfolded, as shown in FIG. 15.

Returning to the embodiments shown in FIGS. 1-17, the lockout box 26, 126, 226 may be positioned to restrict access to the steering wheel 24 when the front seat 22*f*, 122*f* is in the folded position. For example, the lockout box 26, 126, 226 may be supported by the seatback 36 at the top end 42 and the lockout box 26, 126, 226 may extend away from the bottom end 44 of the seatback 36 beyond the top end 42, e.g., such that the lockout box 26, 126, 226 is adjacent or abuts the steering wheel 24 when the seat 22*f*, 122*f* is in the folded position. To put it another way, the front surface 60 may extend across the steering wheel 24, e.g., along the cross-vehicle axis A2, when the front seat 22*f*, 122*f* is in the folded position.

The lockout box 26, 126, 226 may be positioned to inhibit view of the steering wheel 24 from the passenger cabin 32 when the front seat 22*f*, 122*f* is in the folded position. For example, and with reference to the embodiments shown in FIGS. 1-10, the front surface 60 that is adjacent or abuts the steering wheel 24 may have a width W1, e.g., between opposing side surfaces 66, and a height H1, e.g., between the top surface 62 and the bottom surface 64, that are greater than a diameter D1 of the steering wheel 24, e.g., of an outermost circumference of the steering wheel 24. The steering wheel 24 may be between the opposite side surfaces 66 of the lockout box 26 and between the top surface 62 and the bottom surface 64 of the lockout box 26, e.g., along the cross-vehicle axis A2 and the vehicle vertical axis A3. As another example, and with reference to the embodiment shown in FIGS. 11-18, the front 160 of the lockout box 226 may include an opening 192. The opening 192 provides access to the chamber 172. The opening 192 enables the steering wheel 24 to be in the chamber 172 when the seat 22*f* is in the folded position and the lockout box 226 is in the erect position. For example, the steering wheel 24 may pass through the opening 192 as the front 160 of the lockout box 226 is unfolded while the seat 22*f* is in the folded position.

Returning to the embodiments shown in FIGS. 1-17, the lockout box 26, 126, 226 may be positioned to restrict access to the gear selector 28 when the front seat 22*f*, 122*f* is in the folded position. For example, the lockout box 26, 126, 226 may include an extension 70. The extension 70 may be positioned to restrict access to the gear selector 28 when the front seat 22*f*, 122*f* is in the folded position. The extension 70 may provide a physical barrier between an occupant of the passenger cabin 32 and the gear selector 28. The extension 70 may be adjacent or abut the gear selector 28, e.g., when the front seat 22*f*, 122*f* is in the folded position. The extension 70 may be proximate the top end 42 of the seatback 36. To put it another way the extension 70 may be closer to the top end 42 of the seatback 36 than the bottom end 44 of the seatback 36. For example, and with reference to the embodiments shown in FIGS. 1-10, the lockout box 26 may include a main body 68, with the extension 70 extending from the main body 68. The extension 70 may extend away from the first side 46 of the seatback 36 of the front seat 22*f*, 122*f* beyond the second side 48 of the seatback 36. As another example, and with reference to the embodiment shown in FIGS. 11-18, the extension 70 may extend from the bottom 164 of the lockout box 226 and away from the sides 166.

The lockout box 26, 126, 226 may be positioned to permit access to the infotainment interface 40 when the front seat 22*f*, 122*f* is in the folded position, e.g., while access to the steering wheel 24 and gear selector 28 is restricted. Permitting access to the infotainment interface 40 allows an occupant to control the environment within the passenger cabin 32 without interfering with navigation of the vehicle 20, e.g., the occupant may adjust a temperature of the passenger cabin 32, a volume or station of a radio playing, etc., but may not control the vehicle propulsion and steering. For example, the lockout box 26, 126, 226 may be free of providing a barrier between an occupant of vehicle 20 and the infotainment interface 40. For example, extension 70 of the lockout box 26, 126, 226 may be spaced from the infotainment interface 40, e.g., while the front seat 22*f*, 122*f* is in the folded position.

The lockout box 26, 126, 226 may be positioned to permit access to the steering wheel 24, e.g., when the front seat 22*f*, 122*f* is in the upright position. For example, the lockout box 26, 126, 226 may be spaced from the steering wheel 24 when the front seat 22*f*, 122*f* is in the upright position.

Figure 6:
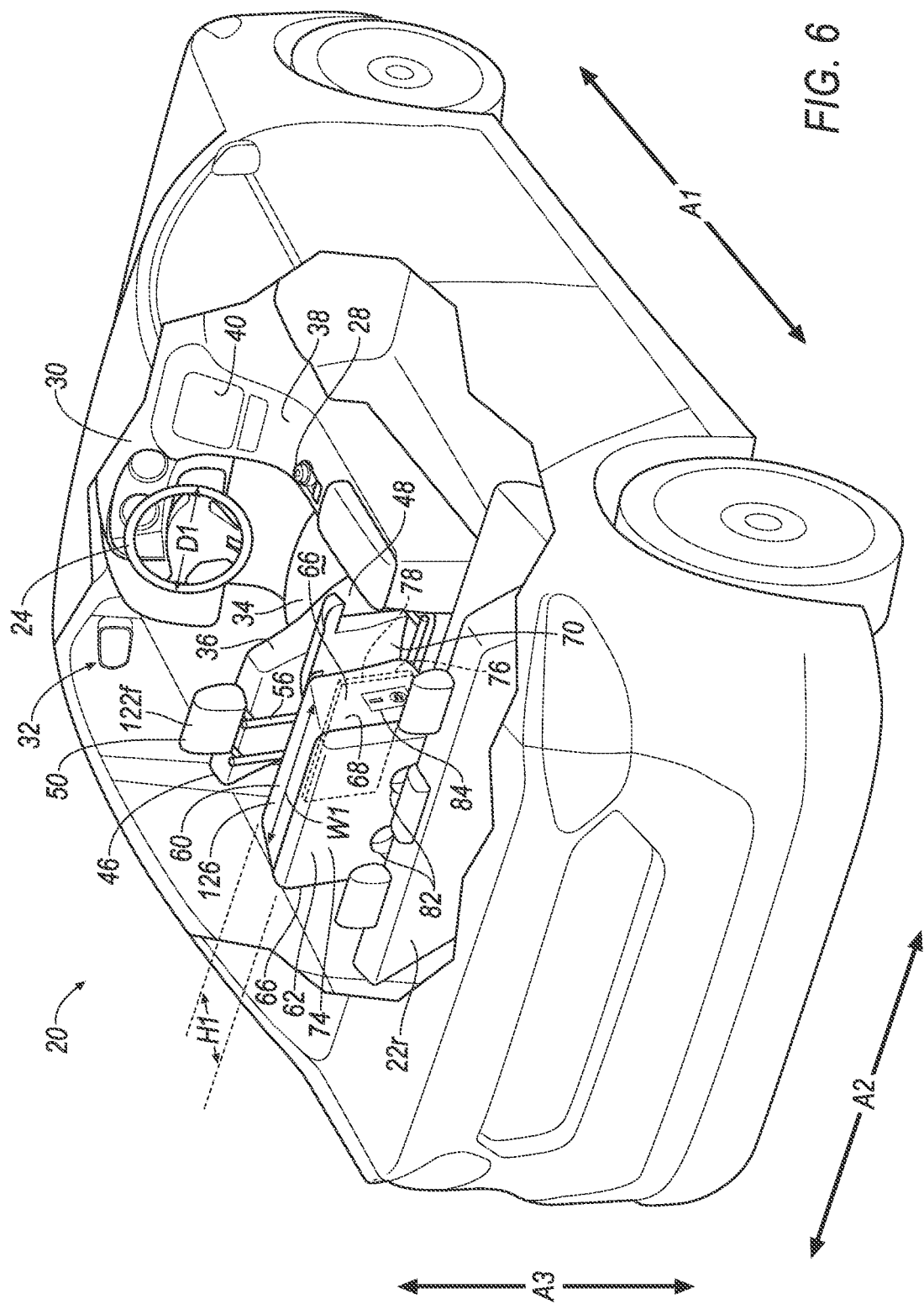
FIG. 6 is a perspective view of the vehicle with another embodiment of a seat in an upright position and having rails supporting a lockout box.
Figure 7:
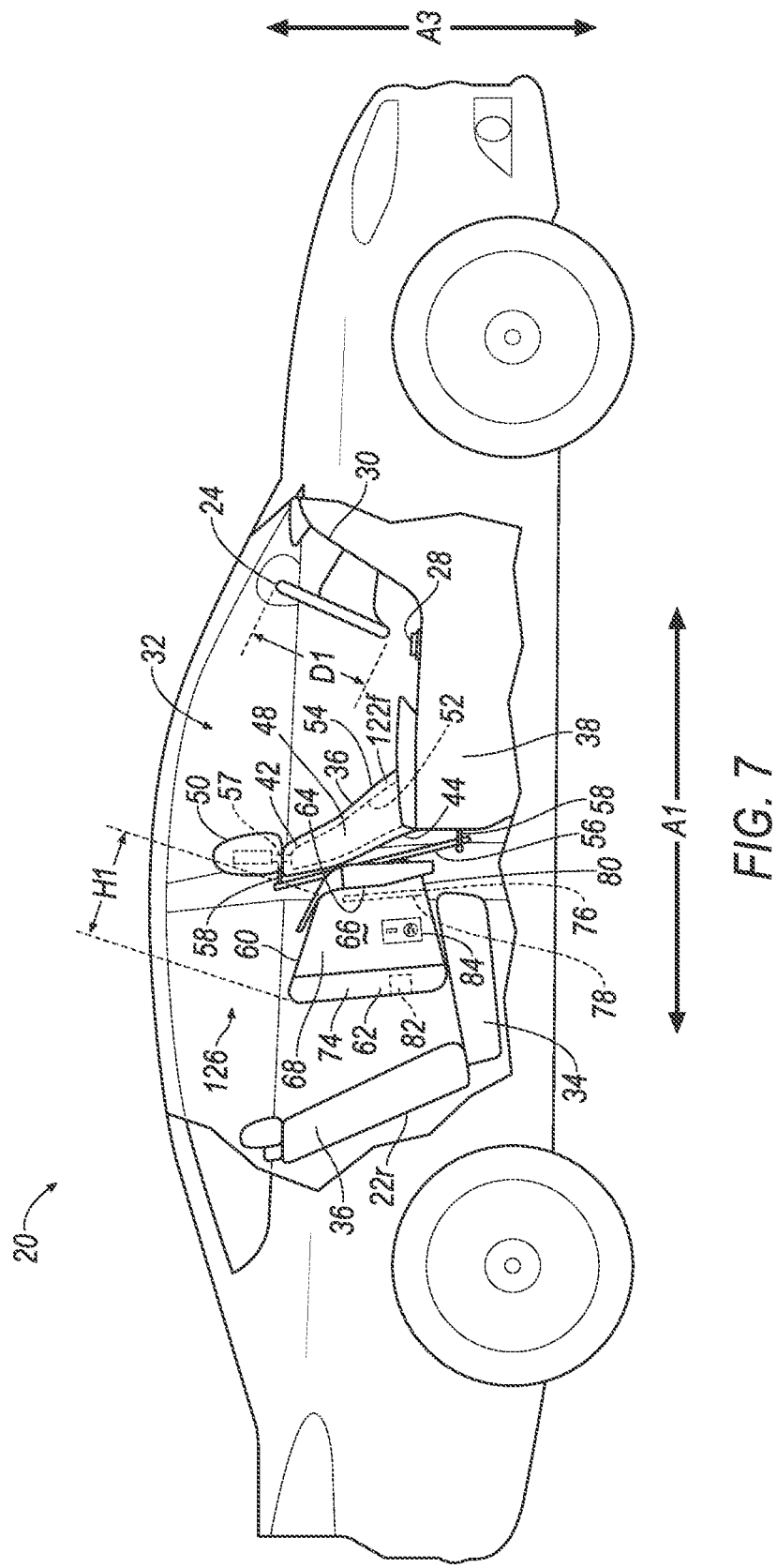
FIG. 7 is a side view of the vehicle with the seat in the upright position and having rails supporting the lockout box of FIG. 6.
Figure 8:
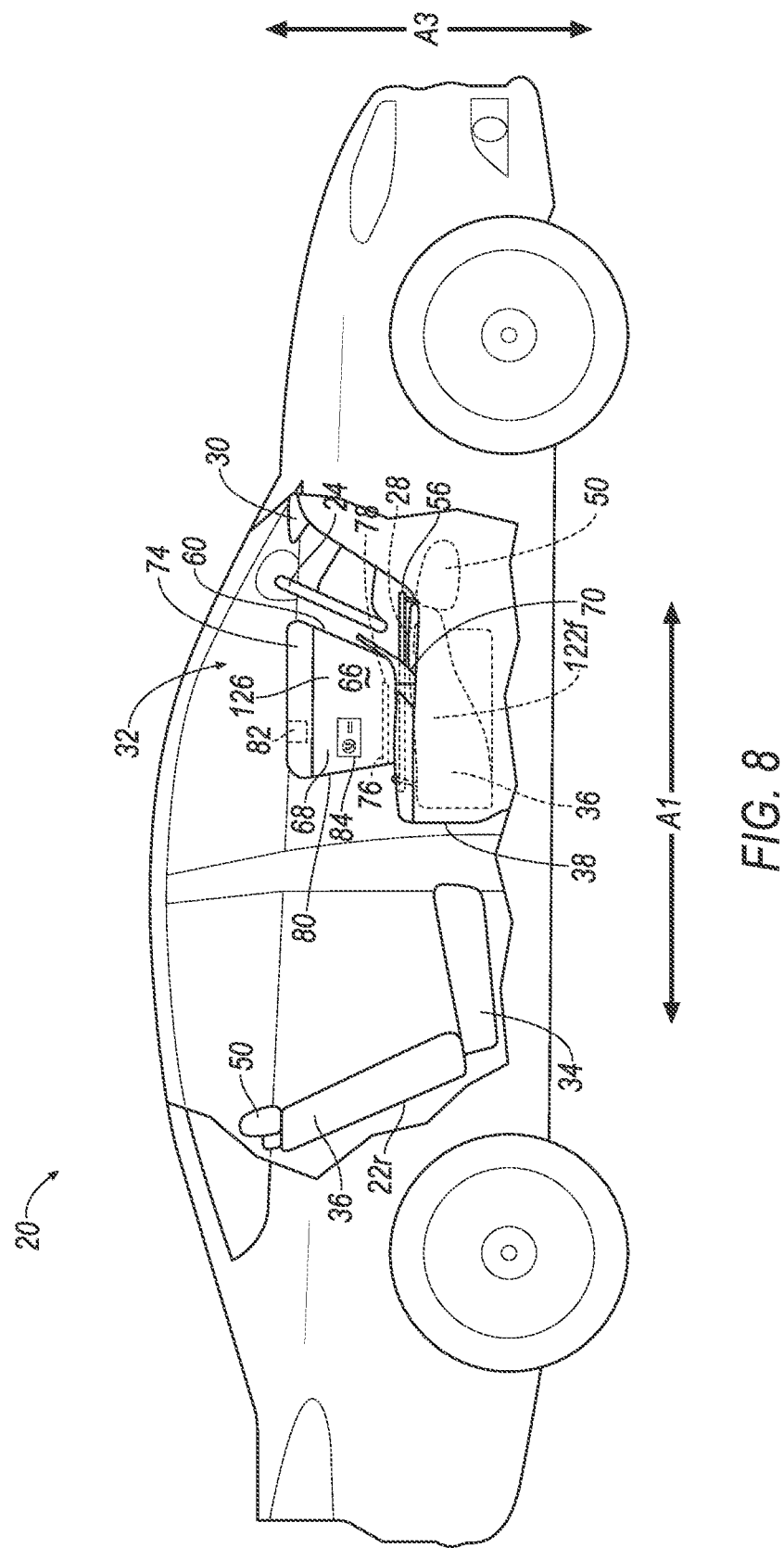
FIG. 8 is a side view of the vehicle with the seat in a folded position and having rails supporting the lockout box of FIG. 6.
Figure 9:
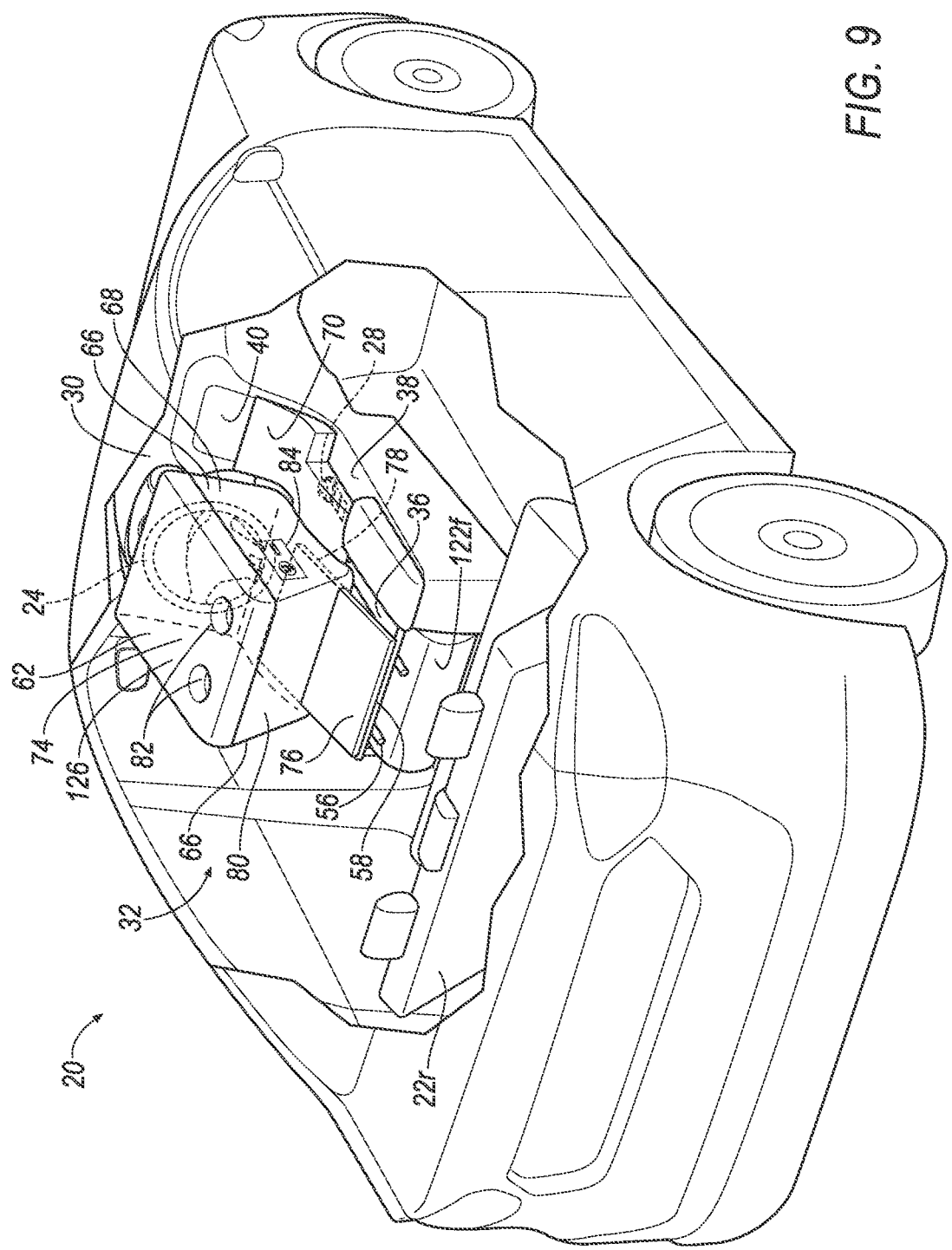
FIG. 9 is a perspective view of the vehicle with the seat in the folded position and having rails supporting the lockout box of FIG. 6.
Figure 10:
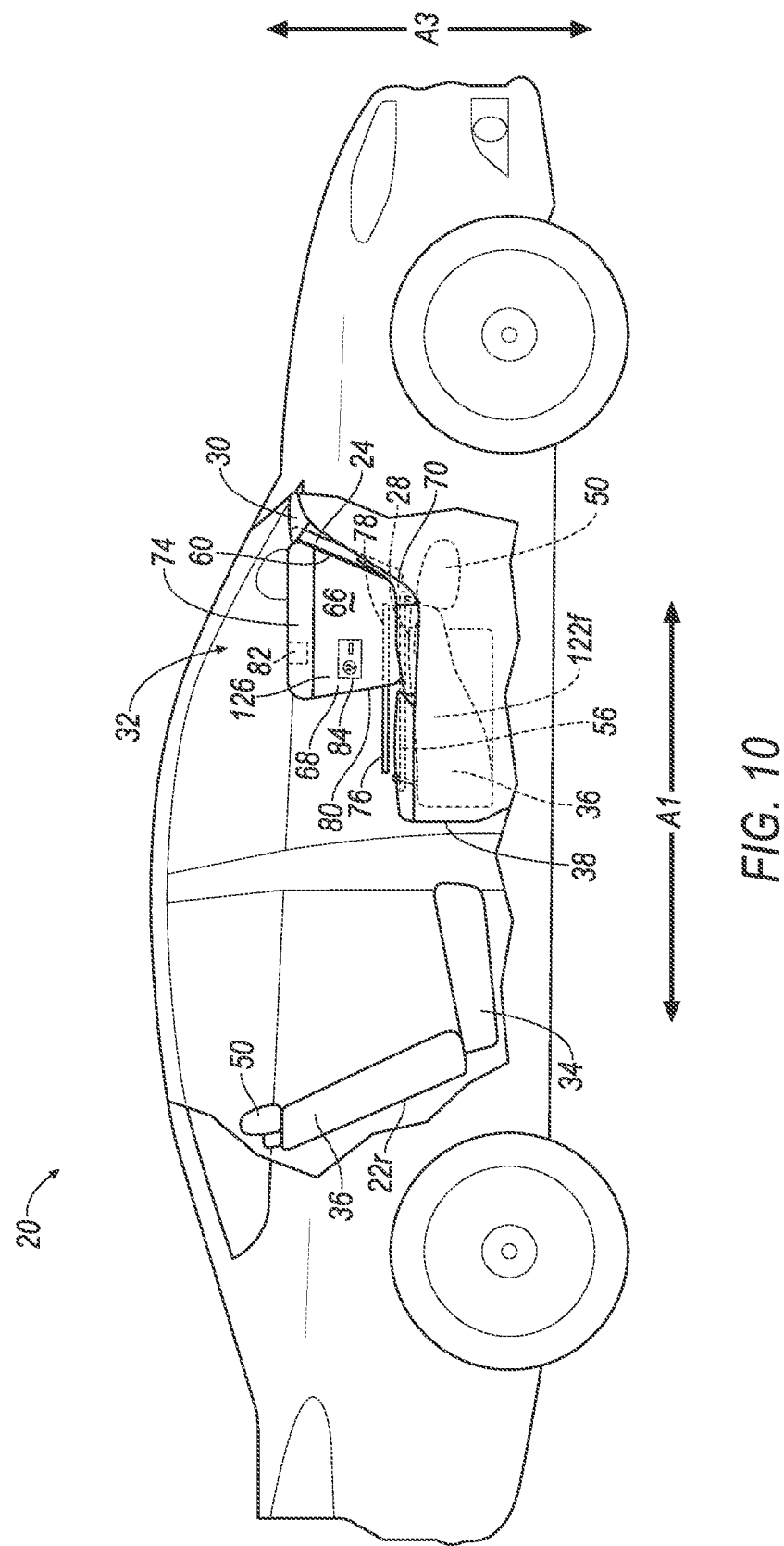
FIG. 10 is a side view of the vehicle with the seat in the folded position and having rails supporting the lockout box of FIG. 6.
Figure 11:
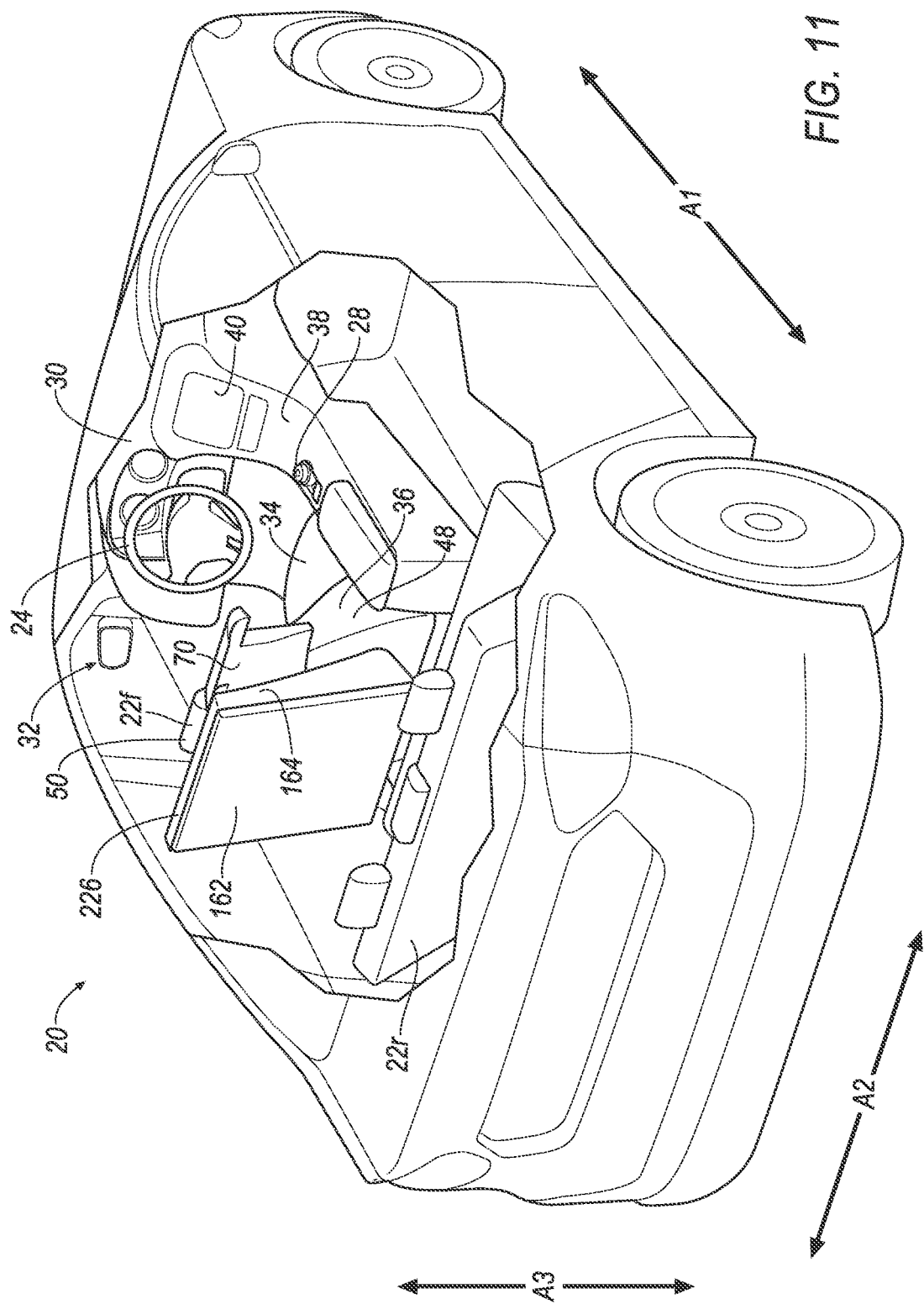
FIG. 11 is a perspective view of the vehicle with the seat in the upright position and supporting another embodiment of a lockout box in a collapsed position.
Figure 12:
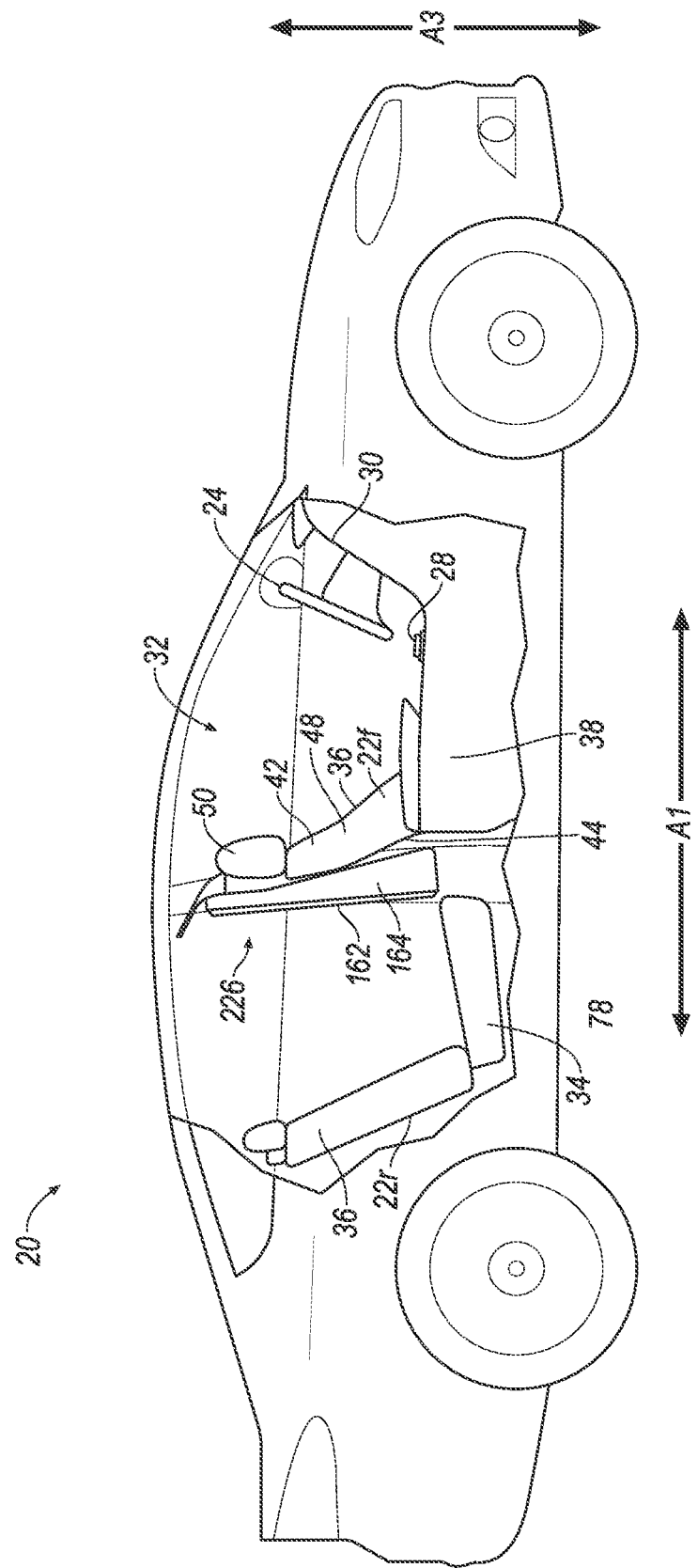
FIG. 12 is a side view of the vehicle with the seat in the upright position supporting and the lockout box of FIG. 10 in the collapsed position.
Figure 13:
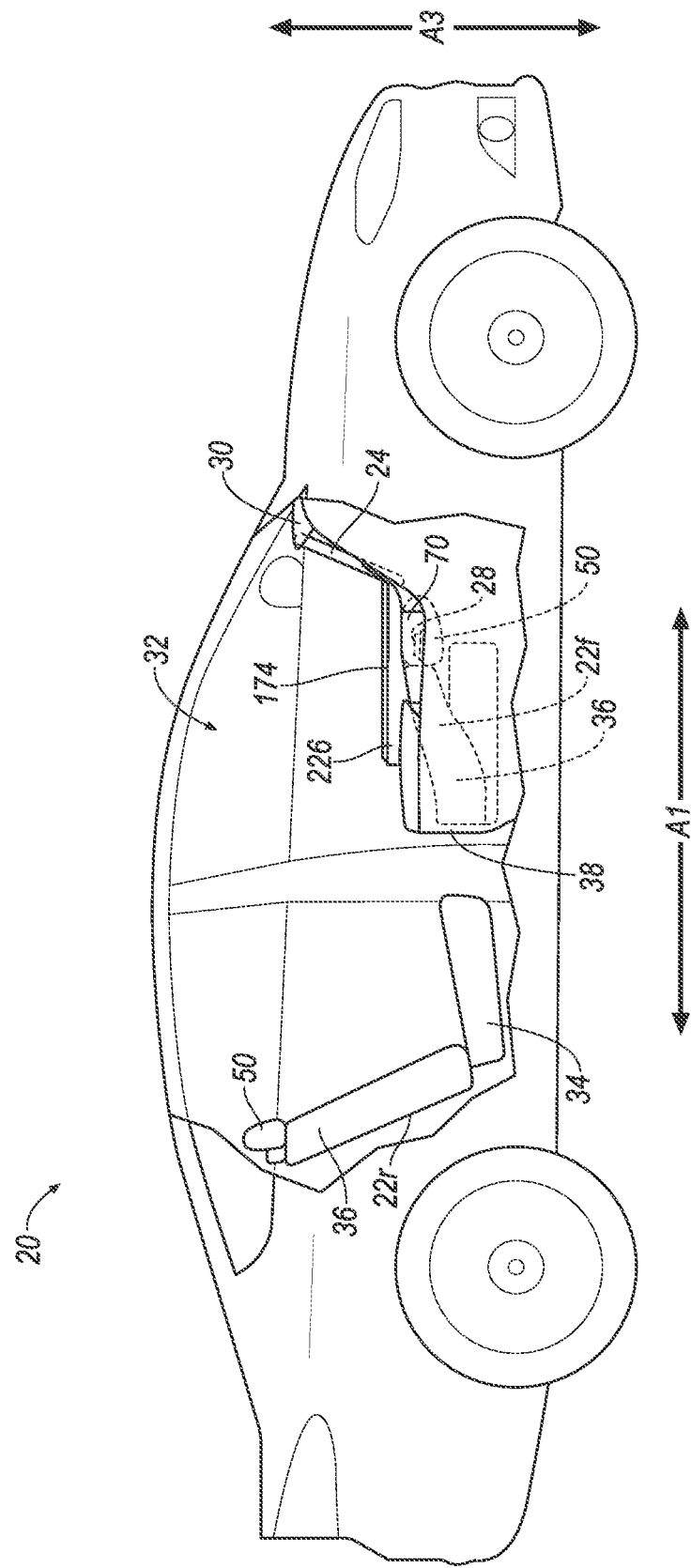
FIG. 13 is a side view of the vehicle with the seat in the folded position and supporting the lockout box of FIG. 10 in the collapsed position.

With reference to the embodiment shown in FIGS. 6-10, the lockout box 126 may be moveable between a first position, shown in FIGS. 6-8, and a second position shown in FIGS. 9 and 10. The first position may be proximate the bottom end 44 of the seatback 36, i.e., closer to the bottom end 44 than the top end 42. The second position may be proximate the top end 42 of the seatback 36, i.e., closer to the top end 42 than the bottom end 44.

The lockout box 126 in the first position enables an operator to use a rearview mirror of the vehicle 20. For example, when the front seat 122*f* is in the upright position, the extension 70 of the lockout box 126 in the second position may block a line of sight of the operator via the rearview mirror, while the extension 70 of the lockout box 126 in the first position may not. For example, the lockout box 126 in the first position may be adjacent the back seat 22*r* when the front seat 122*f* is in the upright position. The lockout box 126 in the first position may be spaced from the steering wheel 24 when the front seat 122*f* is in the folded position.

The lockout box 26 in the second position restricts access to the steering wheel 24 and gear selector 28 when the front seat 122*f* is in the folded position. For example, the lockout box 26 in second position may be adjacent or abut the steering wheel 24 when the front seat 122*f* is in the folded position.

The lockout box 126 may be slidably supported by the rail 56. To put it another way, the lockout box 126 may be supported by the rail 56 and slidable along the rail 56 between the first position and the second position. For example, the lockout box 126 may include rollers, holes, guides, etc., that engage with the rail 56 to inhibit movement of the lockout box 126 transvers to the rail 56 and permit movement along the rail 56. Although not shown, it is to be understood that the collapsible lockout box 226 may also be moveable between the first position and second position, e.g., the bottom 164 of the collapsible lockout box 226 may be slidably supported by the rails 56.

Returning again to FIGS. 1-10, the lockout box 26, 126 may define a chamber 72, e.g., at an interior of the lockout box 26, 126. The chamber 72 may be used as storage space by an occupant of the vehicle 20. The lockout box 26, 126 may include a lid 74 movable to an open position, shown in FIG. 4, permitting access to the chamber 72. The lid 74 may be pivotally supported by the main body 68, e.g., with a hinge. The top surface 62 of the lockout box 26, 126 may be on the lid 74.

The lockout box 26, 126 may include a shelf 76 movable from a retracted position, shown in FIGS. 1, 2, and 6-8, to an extended position, shown in FIGS. 3-5, 9 and 10. The shelf 76 provides additional working surface for an occupant of the vehicle 20, e.g., to support a laptop, a book, a notebook, etc. The shelf 76 may slide relative to the main body 68 between the retracted position and the extended position. For example, the main body 68 may include a passage 78 extending from a rear surface 80 of the lockout box 26, 126 toward the front surface 60. The shelf 76 may be slidable within the passage 78, e.g., along a track, etc.

The lockout box 26, 126 may include a cupholder 82. The cupholder 82 may be in the top surface 62 of the lockout box 26, 126, e.g., to hold a beverage container when the front seat 22*f*, 122*f* is in the folded position.

The lockout box 26, 126 may include an electrical outlet 84. The electrical outlet 84 may be a 110-volt AC outlet, a USB type outlet, an induction charging pad, etc. The electrical outlet 84 may be in electrical communication with a power system of the vehicle 20, e.g., to provide electricity to the electrical outlet 84.

When the vehicle 20 is operated in the semi-autonomous mode or the non-autonomous mode the lockout box 26, 126, 226 may be positioned to permit access to the steering wheel 24 and the gear selector 28. For example, the seat 22*f*, 122*f* may be in the upright position, the lockout box 126 may be in the first position, the lockout box 226 may be in the collapsed position, etc. When the vehicle 20 is operated in the autonomous mode the lockout box 26, 126, 226 may be positioned to restrict access to the steering wheel 24 and the gear selector 28. For example, the seat 22*f*, 122*f* may be in the folded position, the lockout box 126 may be in the second position, the lockout box 226 may be in the erect position, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
 a seat movable from an upright position to a folded position;
 a steering wheel in front of the seat;
 a gear selector; and
 a lockout box supported by the seat and positioned to restrict access to the steering wheel when the seat is in the folded position, the lockout box including a main body and an extension extending from the main body, the extension positioned to restrict access to the gear selector when the seat is in the folded position.

2. The vehicle of claim 1, wherein the lockout box abuts the steering wheel when the seat is in the folded position and is spaced from the steering wheel when the seat is in the upright position.

3. The vehicle of claim 1, wherein the seat includes a seat bottom and a seatback, the seatback between the seat bottom and the lockout box when the seat is in the folded position.

4. The vehicle of claim 1, further comprising a rail supported by the seat, the lockout box slidably supported by the rail.

5. The vehicle of claim 4, wherein the lockout box is slidable along the rail from a first position spaced from the steering wheel to a second position adjacent the steering wheel when the seat is in the folded position.

6. The vehicle of claim 5, further comprising a second seat behind the seat, the lockout box in the first position adjacent the second seat when the seat is in the upright position.

7. The vehicle of claim 1, further comprising a center console, the gear selector supported by the center console.

8. The vehicle of claim 1, further comprising an infotainment interface, the lockout box positioned to permit access to the infotainment interface when the seat is in the folded position.

9. The vehicle of claim 1, further comprising a passenger cabin, the lockout box positioned to inhibit view of the steering wheel from the passenger cabin when the seat is in the folded position.

10. An assembly, comprising:
 a seat bottom;
 a seatback having a top end opposite a bottom end supported by the seat bottom; and
 a lockout box supported by the seatback and extending away from the bottom end beyond the top end.

11. The assembly of claim 10, further comprising a headrest supported by the seatback at the top end.

12. The assembly of claim 10, wherein the seatback includes a first side opposite a second side extending between the top end and the bottom end, and the lockout box includes an extension extending away from the first side beyond the second side and proximate the top end.

13. The assembly of claim 10, wherein the lockout box is collapsible.

14. The assembly of claim 13, wherein the lockout box includes a bottom, a side, and a hinge connecting the bottom to the side.

15. The assembly of claim 10, wherein the lockout box defines a chamber and includes a lid movable to an open position permitting access to the chamber.

16. The assembly of claim 10, wherein the lockout box includes a shelf movable from a retracted position to an extended position.

17. The assembly of claim 10, wherein the lockout box includes a cupholder.

18. The assembly of claim 10, wherein the lockout box includes an electrical outlet.

19. A vehicle, comprising:
 a seat movable from an upright position to a folded position;
 a steering wheel in front of the seat;
 a lockout box supported by the seat and positioned to restrict access to the steering wheel when the seat is in the folded position; and
 a rail supported by the seat, the lockout box slidably supported by the rail.

20. The vehicle of claim 19, wherein the lockout box is slidable along the rail from a first position spaced from the steering wheel to a second position adjacent the steering wheel when the seat is in the folded position.

* * * * *